Figure 1:
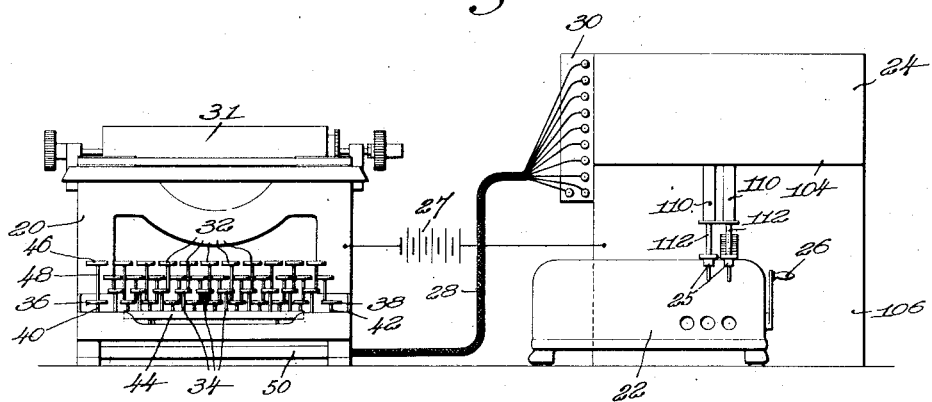

Oct. 27, 1931.    E. L. MORSS ET AL    1,829,233
MACHINE FOR PREPARING TYPEWRITTEN COPY
Filed Sept. 18, 1928    7 Sheets-Sheet 1

Witness
Frederick S. Greenleaf

Inventors
Edward L. Morss
Arthur W. Buckwell
Carl G. Smith
by their attorneys
Van Everen, Fish, Hildreth & Cary Oct. 27, 1931.  E. L. MORSS ET AL  1,829,233
MACHINE FOR PREPARING TYPEWRITTEN COPY
Filed Sept. 18, 1928    7 Sheets-Sheet 2
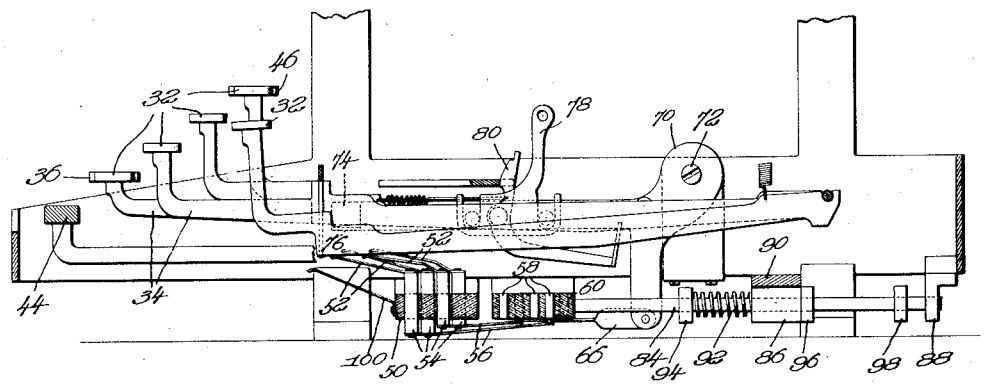
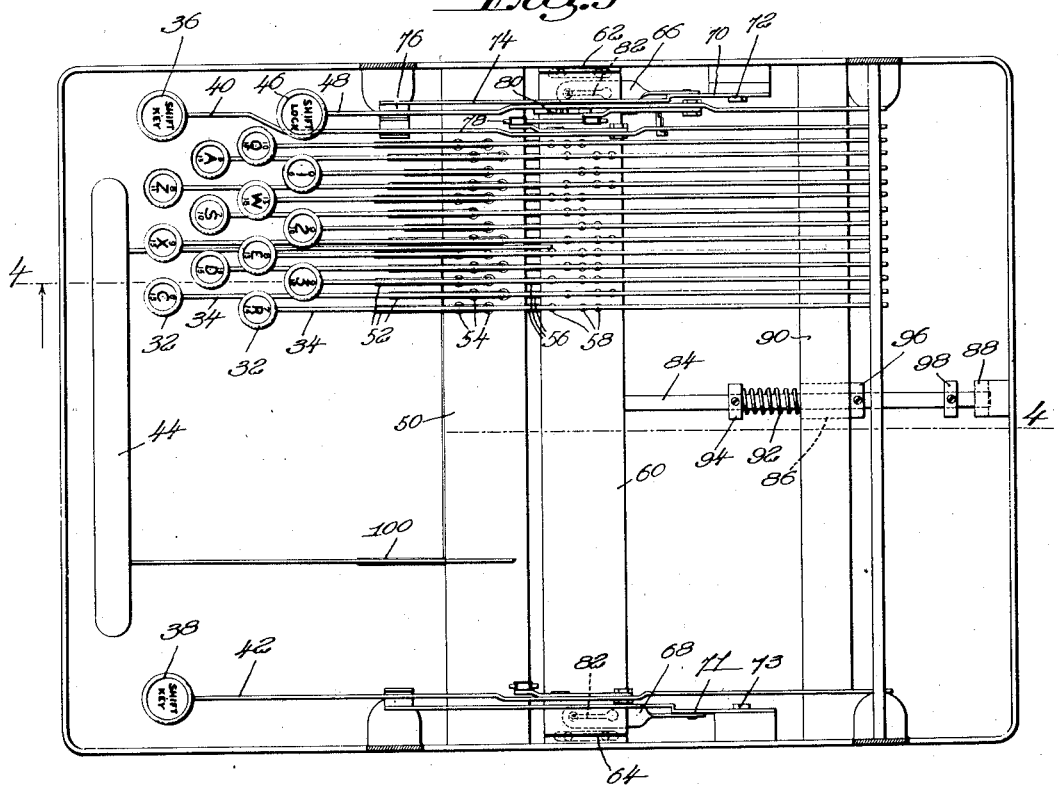

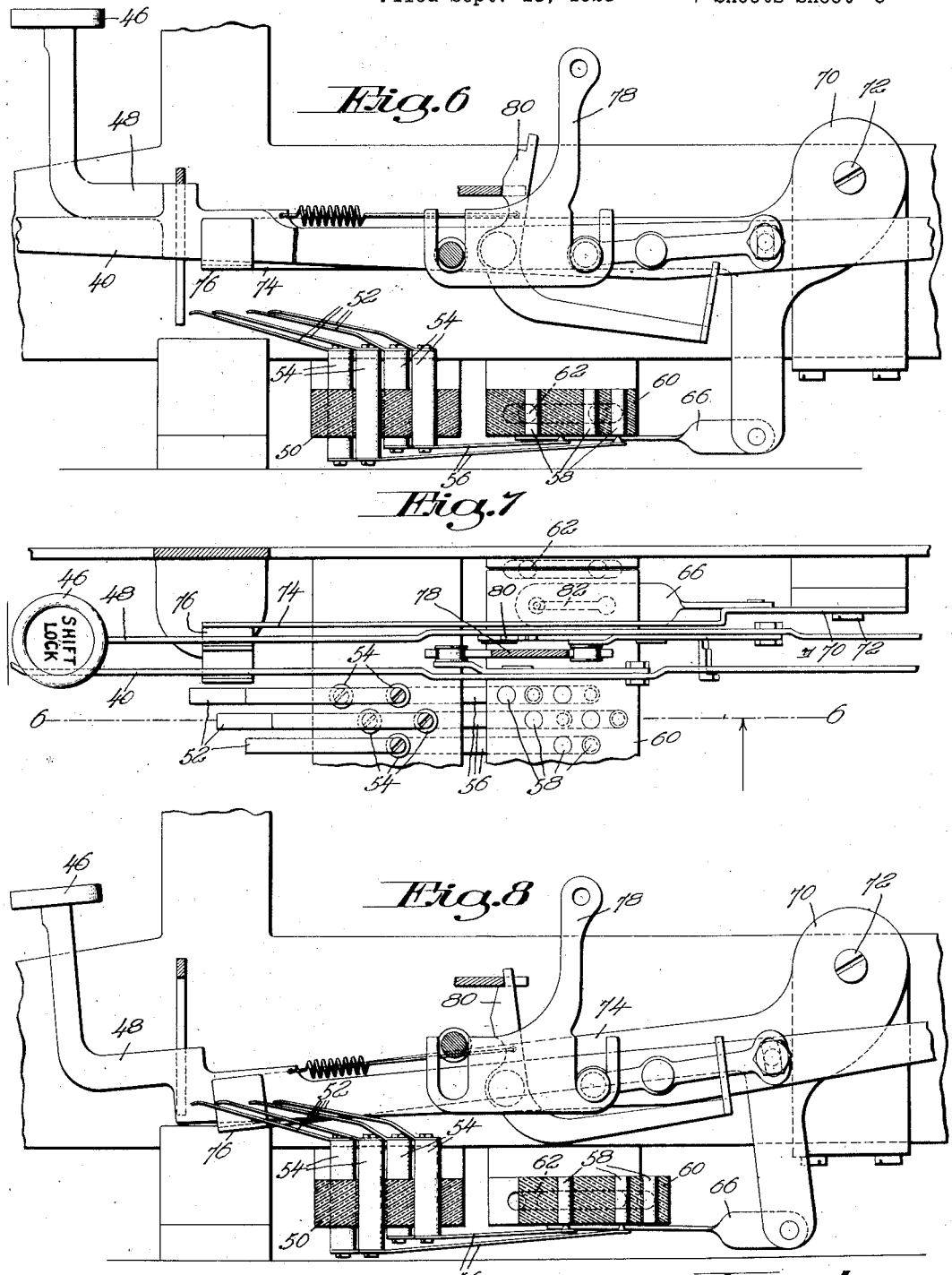

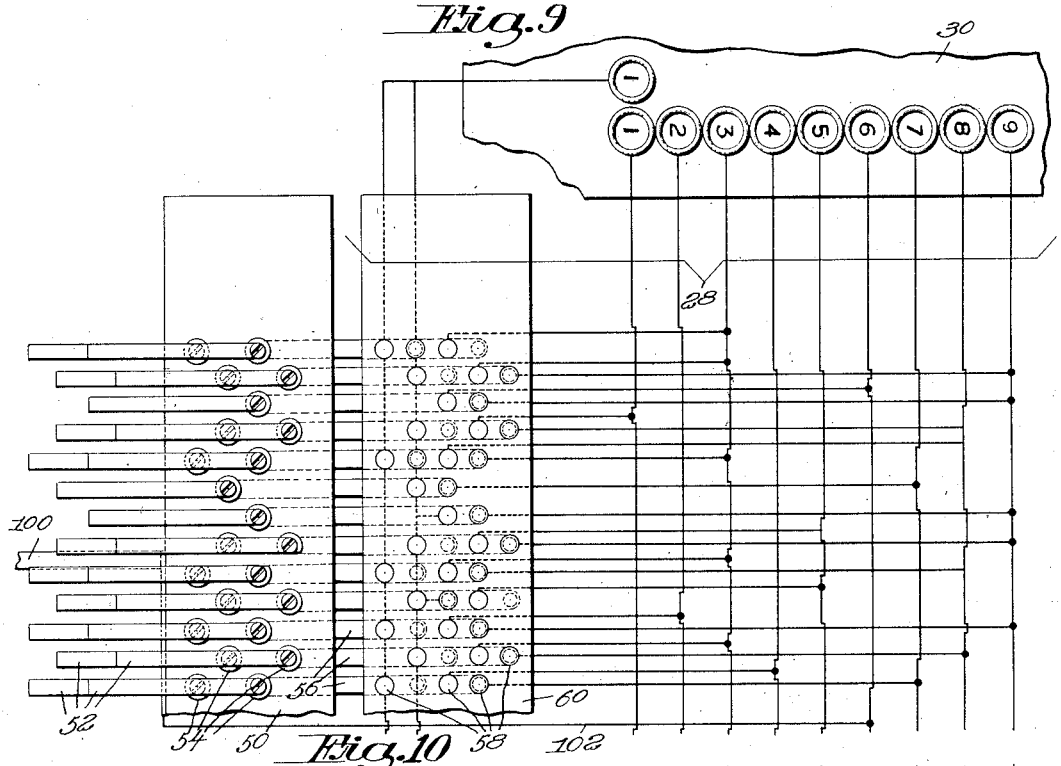
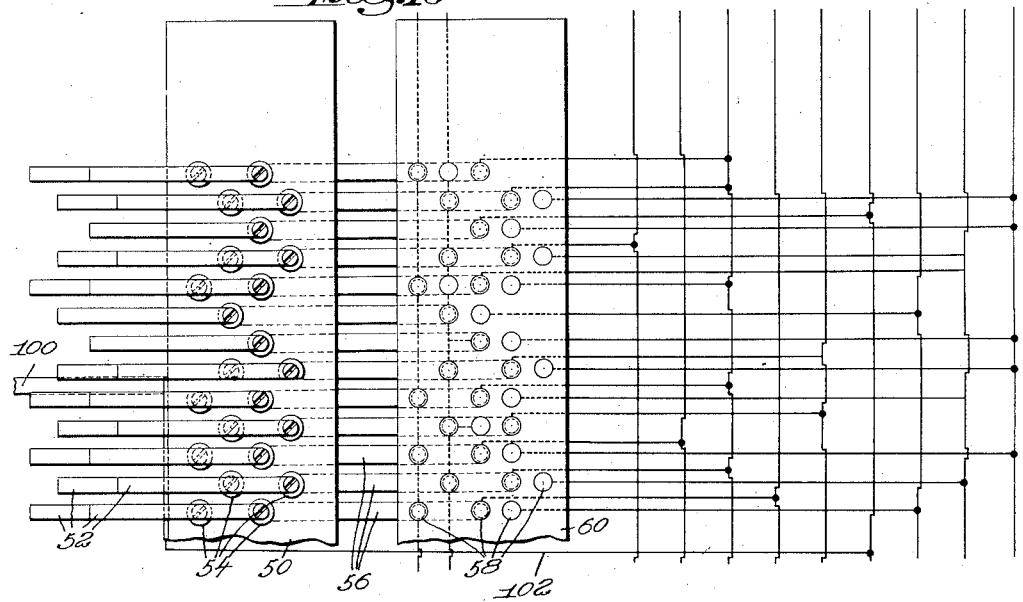

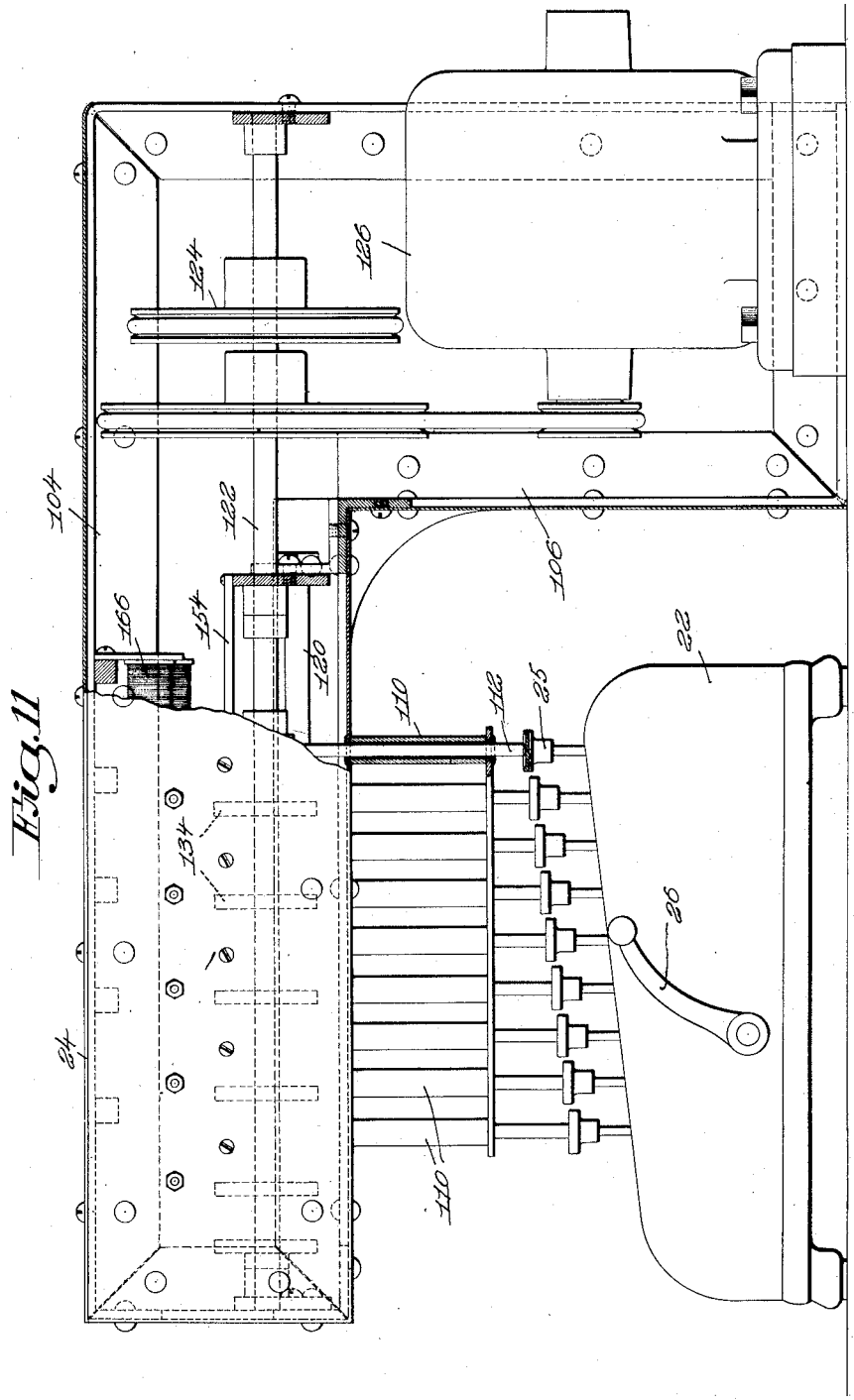

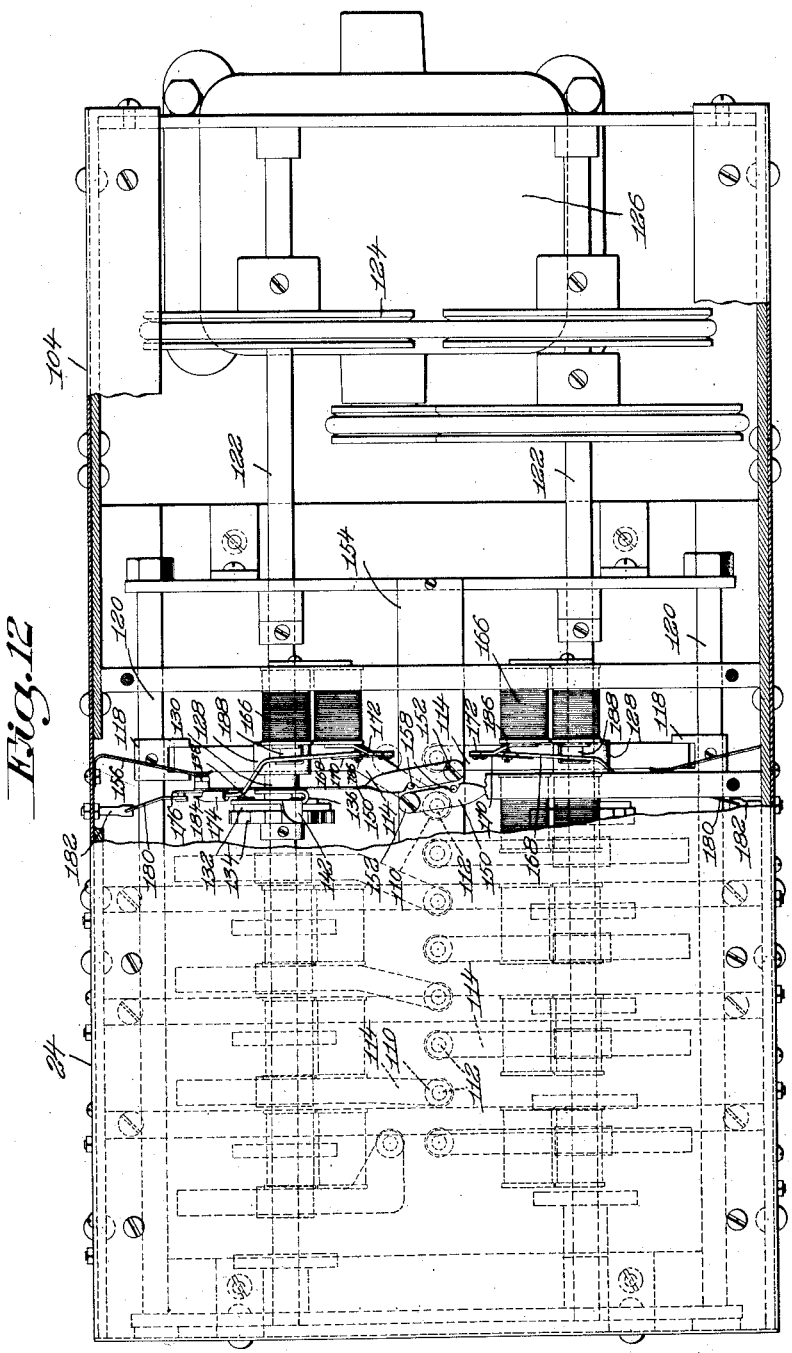

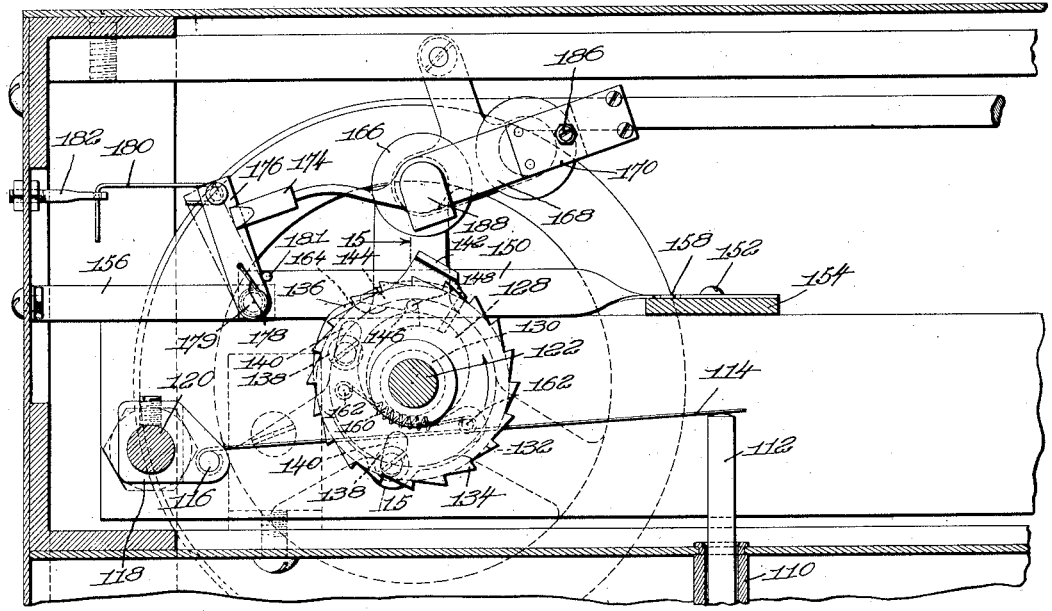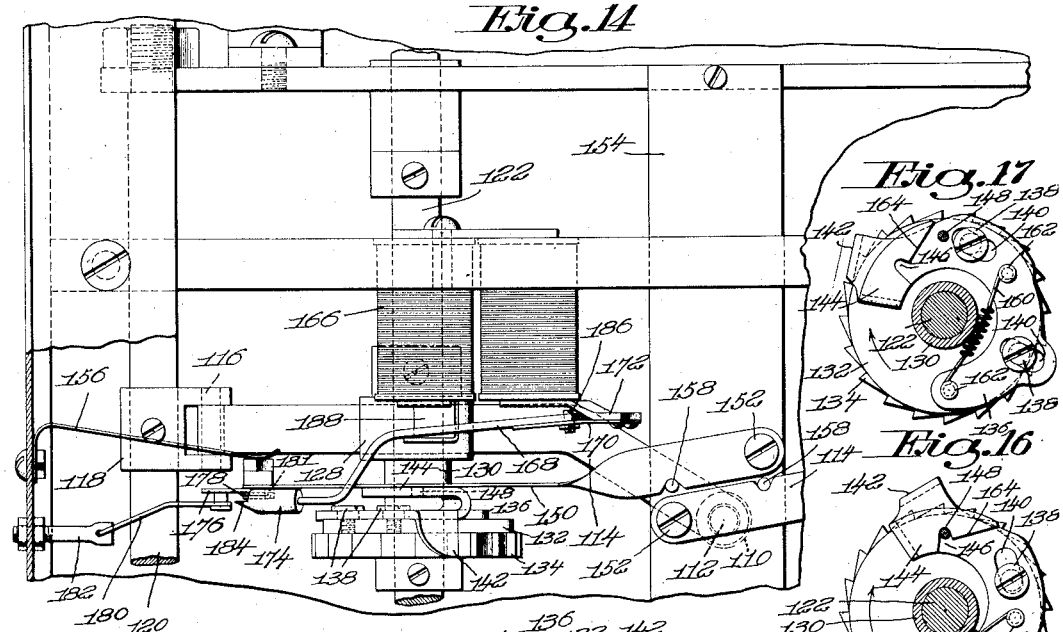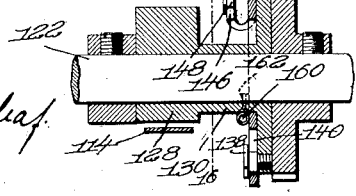

Patented Oct. 27, 1931

1,829,233

UNITED STATES PATENT OFFICE

EDWARD L. MORSS, OF NEEDHAM, ARTHUR W. BUCKWELL, OF QUINCY, AND CARL G. SMITH, OF WATERTOWN, MASSACHUSETTS, ASSIGNORS TO GINN AND COMPANY, A COPARTNERSHIP, OF BOSTON, MASSACHUSETTS

MACHINE FOR PREPARING TYPEWRITTEN COPY

Application filed September 18, 1928. Serial No. 306,761.

The present invention relates to machines for preparing typewritten copy for compositors.

Books and other printed matter are usually made from typewritten manuscripts. The composition of type from typewritten copy offers a number of difficulties, principal of which resides in the fact that the manuscript has characters of equal widths while the composed type characters are of widely varying widths. For example, in the manuscript, the letters "M" and "f" take exactly the same width of line because of the uniform carriage movement of the typewriter, but in ordinary types the former may be as much as three times as wide as the latter.

The variation in line lengths in the transition from copy to print will be made clear by considering numerical type-width values of some common character. For this purpose, any arbitrary system may be adopted, but for purposes of the present invention it is convenient to base type widths on their relation to the letter "M". Thus the "M" is taken as being a certain number of units in width, in this case, 18 units. The unit may therefore be defined as one-eighteenth of the width of the "M". All other characters are then assigned definite width values, expressed as a certain number of units, for example, "A" is 13 units, "a" is 9, "i" is 5, "R" is 14, the period is 3, the comma is 5, and so on, any or all of which may, of course, be varied to meet the requirements of existing type of composing machines or of hand composition. The code of values having been fixed upon, it will be the same for all sizes of type of a given style, although it may vary for different styles of type. It will be seen that although the typewriter characters require the same width, the type contains characters which vary in width by a ratio of almost four to one.

The manuscript can not ordinarily be prepared with regard for the resulting content of the lines of type because it is difficult to predict what the printed arrangement will be. The printed page must be set up from the manuscript, either by hand or on a composing machine, and corrections must be made in the proof for any unsatisfactory conditions of arrangement. The printed book will correspond with the copy only in that it has the same succession of words; the arrangements of lines and pages will inevitably differ. As an example of awkwardness in arrangement, the proof may show a chapter ending with only three or four words on a page, or even worse, the space required for a cut may turn out to be divided between two pages. In some cases it is necessary to add to or delete from the subject-matter and a consultation must then be arranged with the author, a matter of some difficulty at times if delay has been experienced in the setting of the type. In any event, corrections are eventually made and another proof is run and examined and so on, until a satisfactory arrangement for final form is obtained. Since the use of the elaborate typesetting equipment and the services of highly skilled compositors are required, the expense of this preliminary work is an unduly large proportion of the total cost of publication.

The principal object of the present invention is to provide a machine for preparing manuscript, by which the arrangement of lines, pages, and all parts of the matter to be printed may be predicted.

A further object of the invention is to provide a machine by which line-for-line and page-for-page copy may be prepared.

With these objects in view, the principal feature of the present invention comprises a type layout machine consisting of the combination of a typewriting mechanism adapted to print characters in any usual or preferred manner, together with means for indicating the summation of the type-width values of the individual characters as they will appear when composed in type in order that the limit of permissible movement of the typewriter carriage for any line may be determined. In the preferred form of the invention, the typewriting mechanism is of the usual form having an intermittently movable carriage which is advanced a uniform distance upon the depression of any key, whereby all typewritten characters and spaces require the same width value. The means for indicating the summation of the type-width value of the composed characters consists of an adding mechanism, together with devices for setting up on the adding mechanism the numerical type-width values of the typewritten characters. Although the typewriter prints characters which are of uniform widths, the width values of the individual type letters composed from the typewritten copy will vary and it is the purpose of the present invention to insure that in the preparation of copy, the typewritten lines will contain just sufficient characters to make justified printed lines of the proper lengths.

In using the present invention, the adding mechanism is set at zero at the beginning of a line, the words are written on the typewriter in the usual manner, and the adding mechanism adds up the type-width values of the various characters. The length of the line in type units having been previously fixed upon, the operator continues to write upon the typewriter until the sum shown on the adding machine approaches the predetermined limit. If the book is to be prepared with lines 490 units long, for example, the operator will write until the adding machine indicates the closest possible figure to 490, usually something between 470 and 510, the inevitable slight differences on either side of 490 being left to be taken up when the type line is justified by the compositor. The adding mechanism is reset at the end of each line, and succeeding lines are run off in the same manner. When the manuscript is completed, it will be line-for-line with the book to be printed. The typewritten pages will also be prepared to contain the same number of lines as is planned for the printed pages. Furthermore, correct allowances may be made for short lines, so that cuts may be inserted at the proper places opposite the text. The manuscript will, therefore, show exactly the arrangement for the printed book. If any changes are required in the arrangement, they may be made in the copy without going through the expensive procedure of correcting the type after it has been set up. All difficulties of arranging the composed type in page lengths are eliminated and proof reading operations are greatly reduced. Only one composing operation is necessary, and only one proof reading of the composed matter is required, and this only to correct compositor's errors and not for the purpose of adjusting improprieties in arrangement.

Other features of the invention consist in certain novel features of construction, combinations, and arrangement of parts hereinafter described and particularly defined in the claims.

Figure 2:
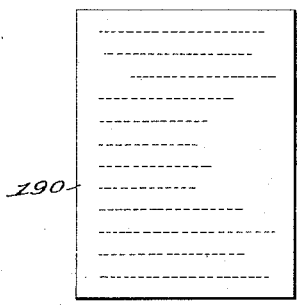
Figure 3:
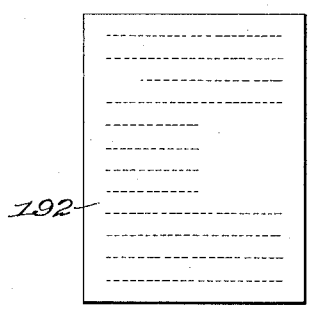

In the accompanying drawings illustrating what is now considered the preferred form of the invention, Fig. 1 is a diagram of the several parts of the machine; Fig. 2 is a diagram showing the arrangement in a page of typewritten copy prepared by the machine; Fig. 3 is a diagram showing the arrangement of type of the printed page prepared from the copy of Fig. 2; Fig. 4 is a detail sectional view of the typewriter on line 4—4 of Fig. 5; Fig. 5 is a plan view of so much of the typewriter as is necessary to explain the present invention; Fig. 6 is an enlarged sectional view on line 6—6 of Fig. 7 of the shift device of the apparatus; Fig. 7 is a plan view of the apparatus shown in Fig. 6; Fig. 8 is a view similar to Fig. 6 but with the parts in a different position; Fig. 9 is a wiring diagram of the apparatus; Fig. 10 is a wiring diagram similar to Fig. 9, but showing the contacts in the position assumed upon depression of a shift key; Fig. 11 is a side elevation partly in section of the adding mechanism and the actuating means therefor; Fig. 12 is a plan view partly in section of the apparatus shown in Fig. 11; Fig. 13 is an enlarged detail view showing one of the clutches in end elevation; Fig. 14 is a plan view of the apparatus shown in Fig. 13; Fig. 15 is a section on line 15—15 of Fig. 13; Fig. 16 is a section on line 16—16 of Fig. 15; and Fig. 17 is a view similar to Fig. 16 but with the parts in a different position.

The illustrated embodiment of the invention comprises essentially three parts; first, a typewriter which is adapted to write characters in the usual manner; second, an adding mechanism; and third, an actuating apparatus for the adding mechanism which is energized upon the depression of any typewriter key to set up on the adding machine the type-width value of the character corresponding to the depressed key. These parts are illustrated diagrammatically in Fig. 1 showing the typewriter 20, the adding mechanism 22, and the actuating apparatus 24. The general construction of the typewriter, so far as the keys, the carriage, the shift mechanism, etc., are concerned, is of any usual or preferred form. The adding mechanism preferably comprises a key-driven adding machine 22 of ordinary type having spring return keys 25 to effect an adding operation without necessity for operation of an auxiliary handle. The adding machine has a reset handle 26. The sum is at all times displayed through windows in the front of the machine. Inasmuch as the maximum individual type-width is 18 units, it is necessary to employ only the 9 unit keys and the single ten's key of the adding machine.

The actuating apparatus 24 comprises a set of ten electrically operated clutches, to be described later in detail, one for each key used on the adding machine. The clutches are energized by a battery 27 which has one terminal connected to the typewriter frame and the other to the frame of the actuating apparatus 24. The clutches are selectively operated upon depression of the typewriter keys, and to this end the key levers of the typewriter are arranged for selective engagement with a set of contacts which are connected by a cable 28 with a set of binding posts on the panel 30, each being connected with a correspondingly numbered clutch of the actuator 24.

The typewriter and its associated contacts will now be described. The typewriter has the usual carriage 31, the type keys 32, the key levers 34, the shift keys 36 and 38 and their associated levers 40 and 42, the space bar 44, the shift lock key 46 and its associated lever 48. The keys, as shown in Fig. 5, may indicate the type width values of the characters for both lower and upper case. The carriage is operated to type characters of equal widths, or of indifferent widths relative to the varying type widths of the printed matter to be composed from the copy. A stationary contact block 50 is supported by the typewriter frame under the row of key levers and carries a plurality of spring contacts 52 which are adapted for engagement by the respective key levers when the latter are depressed. The separate spring contacts are mounted on posts 54. In general, each lever is adapted to engage with two contacts, one of which is adapted to close the clutch for operating the ten's key of the adding machine, and the other for operating one of the unit key clutches. However, for characters which in both lower and upper case the type width value is less than 10, only a single contact is necessary. Each post 54 has secured to the bottom thereof a rearwardly extending spring contact 56 which is adapted for engagement with contacts 58 in a sliding contact block 60. As shown in Figs. 9 and 10, the various contacts 58 of the sliding block connect through the cable 28 with the various clutches of the actuator mechanism through the binding post panel 30. The sliding block 60 is adapted to be positioned as shown in Fig. 9, when lower case characters are being written, and be moved to the position shown in Fig. 10 when the shift key or shift lock key is depressed for the writing of upper case characters. Automatic movement of the sliding block 60 upon operation of the shift or shift lock key is accomplished in the following manner: The contact block is mounted at opposite ends on ball bearings 62 and 64. Links 66 and 68 are connected at opposite ends of the contact block and each is attached to the lower end of one of a pair of bell crank levers 70 and 71 which are pivoted at 72 and 73 near the rear of the machine frame on opposite sides thereof. At the left side of the machine, a horizontal arm 74 of the bell crank lever lies alongside the shift lever 40 and the shift lock lever 48, the arm 74 having an outwardly extending foot 76 adapted to be engaged by either the lever 40 or the lever 48 when depressed. As shown in Fig. 5, a similar construction is provided at the right hand side of the machine except that inasmuch as no shift lock is there provided, the bell crank is actuated only by depression of the right hand shift key. The action of either the shift key or shift lock key is to depress the usual sliding shift member 78 which is of any usual or preferred form and which serves either to lower the type or to raise the carriage of the machine. The shift lock key operates the latch 80 in the usual manner. Operation of any of these keys also serves to rotate one of the bell crank levers, thereby shifting the contact block 60 from its forward position, as shown in Fig. 9, to its rearward position shown in Fig. 10. Inasmuch as the block is moved by the operation of the shift levers at either side of the machine, each link 66 is provided with a lost motion slot 82. Movement of the block 60 parallel to itself is assured by a rod 84 which is secured to the center of the rear edge of the block and which passes through bearings 86 and 88 secured respectively to a cross bar 90 and the rear frame portion of the typewriter. The block is urged toward the forward position by means of a spring 92 encircling the rod 84 and taking between the bearing 86 and a collar 94. The limits of movement of the block are precisely fixed by means of collars 96 and 98 positioned near the rear end of the rod, the former adapted to abut the bearing 86 in the forward position and the latter to abut the bearing 88 in the rearward position.

From Figs. 9 and 10, it will be seen that depression of a key will close the circuit through either one or two clutches of the actuating mechanism. The contacts 56 are adapted for selective engagement with the contacts 58 of the sliding block, depending on the position of the sliding block with respect to the stationary block 50. Thus, if the "q" key is depressed, the circuit is closed through the clutch which operates the 10 key of the adding machine, but if the shift is operated to print "Q", the circuit is closed through the 10 clutch and also the 3 clutch to set up the number 13 on the adding mechanism. In the lower case position for this letter, one of the contacts 56 engages a single contact 58, which contact connects with the number 10 wire of the cable leading to the clutch for depressing the 10 key of the adding machine. Similarly the electrical connections to the other contacts for the other characters are made, the action in any case being such as to close the circuits numbered corresponding to the type width values of the characters of the various typewriter keys.

In he front edge of the stationary block 50 is mounted a spring contact 100 which is at a level slightly below the contacts 52 and which is adapted to be engaged by the space lever when the space bar 44 is depressed. Inasmuch as the value of the space is the same whether the shift key is up or down, this contact connects directly through a wire 102 with the number 6 wire of the cable.

It will be noted that the posts 54 in the stationary contact block and the contacts of the sliding block are arranged in staggered relation. The various contacts and posts might be arranged in regular rows but for the fact that the staggered relation provides somewhat more space for making the necessary connections.

The contact blocks 50 and 60, with their associated contacts, constitute a control means for selectively operating the clutches of the actuating apparatus to set up the proper numerical type width values of the various characters on the adding machine.

The actuating apparatus which forms the connecting mechanism between the typewriter and the adding machine comprises a casing 104 extending above the adding machine and supported in the rear thereof by a frame 106. Depending from the casing are a plurality of guide tubes 110 which overlie the keys of the adding machine and which accommodate vertically movable plungers 112, the separate plungers being adapted to depress the selected keys of the adding machine. The plungers extend upwardly through the casing and each engages the end of a presser bar 114 which is pivoted at 116 to a fulcrum block 118 secured to a longitudinal rod 120. The fulcrum blocks 118 are rotatably adjustable on the rods to permit proper positioning of the presser bars. Two rods 120 are provided, one at each side of the casing, and five of the presser bars are supported from each. The presser bars are of various shapes as shown in Fig. 12, in order that their ends may engage with the upwardly protruding ends of the plungers. Two continuously rotatable shafts 122 extending longitudinally of the casing are operated through belt and pulley connections 124 by an electric motor 126. Loosely mounted on each shaft are a plurality of cams 128, one for each of the presser bars. In order to effect depression of a plunger at the proper time, an electro-magnetically operated single revolution clutch is associated with each cam and serves to connect the cam operatively to the shaft for a single revolution thereof. Each cam, as shown in Fig. 15, has a longitudinally extending hub 130 secured to the end of which is a pawl carrier wheel 132. The cam 128, the hub 130, and the pawl carrier 132 may be machined in a single piece. Secured to the shaft adjacent to the pawl carrier is a ratchet 134. A pawl plate 136 is slidingly mounted on the pawl carrier and is guided by screws 138 secured to the carrier and passing through elongated slots 140 in the plate. The pawl plate is formed at the top with a pawl 142 normally supported above the teeth of the ratchet. The support for the pawl comprises an outwardly bent portion 144 of the pawl plate, which portion has a notch 146 to receive a detent 148 secured to a cross arm 150. The cross arm 150 is pivoted at 152 on a longitudinally extending brace 154 in the casing and is acted upon at its opposite end by a leaf spring 156 secured to the casing in order to hold the detent normally in engagement with the pawl plate. A stop 158 on the brace 154 determines the normal position of the arm 150. When the detent 148 is moved from engagement with the pawl plate, the pawl is permitted to engage the ratchet by a sliding movement of the pawl plate over the pawl carrier, caused by a spring 160 which is secured at opposite ends on pins 162 on the pawl plate and bears against the hub 130 of the cam. This movement of the detent from engagement with the pawl plate is effected by a movement of the cross arm 150 on its pivot 152 and when it occurs, the ratchet, by engaging the pawl, turns the pawl through a single revolution. The detent having been returned to its original position before completion of the single revolution of the cam, as will hereinafter be described, an inclined surface 164 on the outwardly turned portion of the pawl plate rides up by its momentum on the detent until the latter seats in the notch 146, thereby lifting the pawl from engagement with the ratchet. This single revolution of the cam serves to depress the presser bar 114, thereby actuating the corresponding key of the adding machine.

The movement of the cross arm 150 to disengage the detent from the pawl plate is effected by an electro-magnet 166 which has one end of its winding grounded to the casing and the other end connected to a correspondingly numbered wire of the cable 28 through the binding post panel 30. The electrical connecting wires are omitted from Figs. 11 to 17 for the sake of clearness. Ten of such magnets are provided, one for each of the clutches of the actuator. Upon closure of any magnet circuit through engagement of any typewriter key bar with its contact, the corresponding magnet is energized. Energization of a magnet serves to attract an armature 168 which is connected at one end by a flexible leaf spring 170 to an armature support 172 secured to the magnet frame. Attached to the opposite end of the armature is a throw-out pawl or tooth 174 which, when the armature is attracted, is adapted to strike an upstanding link 176 pivoted on the end of the cross arm 150. The link 176 is urged by a torsion spring 178 into engagement with a stop 181 on the cross arm, the spring, however, permitting the link to turn in a counterclockwise direction, as viewed in Figs. 13, whenever it is engaged by the throw-out pawl 174. The upper end of the link 176 is connected by a rigid wire 180 with an adjustable fixed rod 182 secured to the side of the casing. When the armature is attracted by the magnet, the flat face 184 of the pawl engages the link 176 and thereby moves the link and the cross arm 150 rearwardly. This action disengages the detent 148 from the pawl plate and permits the pawl to move into engagement with the ratchet. As the armature continues its movement toward the magnet, the link 176 turns on its pivot 179 because of the fact that it is being pulled upon by the rigid wire 180. When the link has moved into the position indicated by dot-and-dash lines in Fig. 13, the throw-out pawl 174 is free to pass by the link and therefore the cross arm 150 and the link 176 are returned to their original positions by the spring 156, thereby placing the detent in the path of the inclined surface 164 of the pawl plate so that upon completion of a single revolution of the pawl, it will be permitted to be lifted out of engagement with the ratchet.

Inasmuch as the electro-magnet 166 preferably comprises two coils arranged side by side, there is a possibility that the right hand magnet core, as viewed in Fig. 14, will draw the flexibly mounted armature 168 into engagement therewith without permitting the armature to come within the effective field of the left hand core. If such an action were permitted, a sufficient movement of the throw-out pawl 174 at the end of the armature might not occur. To prevent this action, a fulcrum screw 186 is mounted in the armature near the right hand end thereof and is adapted to strike the magnet support 172 before the armature comes into contact with the core, thereby forming a fulcrum about which the armature may turn so that it will be pulled upon by the field of the left hand magnet.

Although the cross arm 150 is returned immediately to its original position after the throw-out pawl has passed the link 176, the armature will remain in its attracted position until the electrical circuit is broken. When the circuit is broken by release of the typewriter key, the armature is returned by the action of the flexible spring mounting 170, the pawl being permitted to pass the link 176 by the provision of a beveled surface on the front face of the pawl. The retractive movement of the armature is limited by a stop 188.

It will be seen that inasmuch as the pawl is permitted to engage with the ratchet for a single revolution only upon any depression of the typewriter key, it is immaterial how long the typewriter key is held down. The adding machine will therefore add up only the type width value of a single character for any single depression of the typewriter key. Upon release of the typewriter key, the armature is restored to its initial position in readiness for a subsequent actuation of the mechanism.

A feature of importance consists in the manufacture of the presser bar 114 of flexible material. In an adding machine of the key-driven type, only one key in any row can be depressed at one time. If two keys are started together, the first to gain control is permitted to be depressed, while the other is locked out. If by accident, two typewriter keys should be depressed so as to close two circuits in the unit's row, tending to depress two keys in the unit's row in the adding machine, the first to gain control will be completely depressed, while the other will be locked out. If the presser bars were of inflexible material, damage might result because of the force applied by the rotating cam. The flexibility of the presser bars, however, permits the cam of the locked out key to rotate without damage. The presser bars are made only sufficiently flexible to take care of an accidental attempted operation of two or more keys in the unit's row of the machine at the same time, but since the force required to depress a single key in normal operation is slight, the presser bars may obviously be made stiff enough to effect this operation.

Briefly reviewing the operation of the machine, it will be understood that when any typewriter key is depressed, a circuit is closed either through the typewriter frame, the key lever, either one or two of the contacts 52, and a corresponding magnet or magnets of the actuator. If the type-width of the character is not greater than 10, one circuit only will be closed; if greater than 10, two circuits will be closed, one for the ten's key and one for a unit's key of the adding machine. The electrical contacts in the typewriter having been previously arranged so that the proper circuits corresponding to the numerical type-width values of the printed characters are energized, the adding machine will add up these values automatically as the keys of the typewriter are struck. The operator in preparing copy which is to be sent to the compositor, therefore, writes the separate lines on the typewriter and notes the addition of the type-width values on the adding machine. Since the length of line in units will have been previously fixed upon, the operator will be enabled to judge as the end of the line is being approached, exactly how many characters can be put in. Taking the example previously given, if the length of lines has been fixed at 490 units, the operator who is preparing the copy will carefully watch the sum indicated by the adding machine as it approaches 450. It obviously cannot be expected that all lines will come to a proper termination at exactly 490 units, but a variation of 20 units either way is permissible because when the copy is sent to the compositor, the slight differences are taken up by justification, that is, by increasing or decreasing the sizes of the spaces between words. It is, however, assured that the typewritten line contains exactly the same number of characters that the type line will have when properly set up and justified. It is to be noted that justification of the typewritten lines is quite unnecessary and is in fact practically impossible to obtain. The typewritten copy does not differ in appearance from any typewritten manuscript; its only difference resides in the fact that it is line-for-line with the printed page to be made from it.

The relative appearance of the copy and the printed matter will be made clear from Figs. 2 and 3, which are diagrammatic illustrations respectively of a page of manuscript 190 prepared according to the present invention and a page of type matter 192 set up therefrom. The first four lines of the copy which are shown as full lines are of unequal length but they contain the proper number of characters to justify in the printed page as shown in Fig. 3. The next four lines are short measure lines to run around a cut. These are prepared in the copy in exactly the same manner, the number and length in units of these short measure lines having been previously determined from the dimensions of the cut. The remaining four lines of the page are full measure lines in which the numerical value of the line length is restored to its original value.

The operation of the machine offers no particular difficulties. At the beginning of a paragraph, the required number of spaces will be struck off on the space bar of the typewriter and automatically added up on the adding machine. The only inaccuracy to which the apparatus is subject is in the writing of ligatures such as "fl" and "ffl" which, if no special typewriter keys are provided, must be run off as separate letters. The errors are slight in any event and since they occur infrequently, they are small enough to be readily taken up in the process of justification of the type lines.

In preparing copy according to the present invention, if any unsatisfactory conditions of arrangement become apparent, they may be corrected before the copy goes to the compositor; in brief, the copy being line-for-line and page-for-page with the printed book, may be considered as first proof. For example, in the preparation of the copy shown in Fig. 2, it might have occurred that the space required for the cut could not possibly be placed opposite the text because the short measure lines of the text might be divided between two pages. If this happened to be the case, some rearrangement of the text would be necessary either by adding to or deleting from the subject-matter. However, since the work is still in the "copy" stage, no type having been set, the necessary changes may be quickly and inexpensively made. When the typewritten copy is finally worked into satisfactory form, it has the general appearance of the completed book except that the lines do not justify and that the characters appear in ordinary typewriter type. The copy may be sent to the compositor with assurance that the printed proof will be page-for-page and line-for-line with the copy. Only one proof reading is necessary and this only for the purpose of correcting compositor's errors in the transcript. The succession of troublesome proof readings for correction of awkwardness of arrangement is avoided.

It will be noted that the invention as herein described provides for automatically adding the type-width values of all fonts of type in which the various widths bear a certain definite relation to each other. Thus, the machine may be used for a given style of type of any size whatever so long as the width ratios are the same throughout. It may also be used for different styles of type where the width ratios are approximately the same as that for which the machine is designed. It is to be noted that the style of type in the typewriter is a matter of small importance. Thus, if it is desired to change from roman letters to italics, it is unnecessary to alter the typewriter type. A note in the margin of the copy or the conventional underscore is sufficient. Italic type is ordinarily slightly more condensed than roman. If any considerable amount of italicized matter is to be included, it may be necessary to increase the number of units allowed for the line in order to predict the arrangement of the printed lines but for italicizing single words or small phrases, no such correction is necessary because the error which is introduced will be wholly insignificant and may be readily taken up in the process of justification of the type lines.

Similarly, if it is desired to use the smaller type (for foot notes or other uses on the page,) it is necessary only to increase the number of units allowed for the line to compensate for the smaller sizes of type to be used. The typewritten line on the copy will of course extend farther to the right, but when the matter is composed in type, the lines will be of the same length as the standard type line adopted for the page.

It will be understood that the scale of type widths, based on a unit defined as one-eighteenth the width of the "M", has been referred to herein for purposes of illustration only, and that any arbitrary system of widths may be adopted, it being only necessary that the adding mechanism have a sufficient capacity to accommodate all numerical values from the character of smallest width to that of the largest. Likewise, although the preferred construction of the invention has been shown and described, the invention is not to be considered to be limited to such preferred construction, but may include other embodiments, except as limited by the claims.

Having thus described the invention, what is claimed is:

1. A type layout machine having, in combination, a typewriter having provision for typing characters of uniform width, an adding machine, actuating means for the adding machine including plungers for depressing the keys of the adding machine, a continuously rotating shaft, a plurality of cams associated with the several plungers and loosely mounted on the shaft, a single revolution clutch for each cam adapted to operatively connect its corresponding cam with the shaft, and control means associated with the typewriter keys for selectively actuating the clutches to depress their corresponding plungers and thereby to set up on the adding machine the numerical type-width values of the characters typed by the typewriter.

2. A type layout machine having, in combination, a typewriter having provision for typing characters of uniform width, an adding machine, actuating means for the adding machine including plungers for depressing the keys of the adding machine, a continuously rotating shaft, a plurality of cams associated with the several plungers and loosely mounted on the shaft and adapted to depress their corresponding plungers when operatively connected with the shaft, a single revolution clutch including a pawl and ratchet associated with each cam for operatively connecting the cam to rotate with the shaft, and means controlled by depression of a typewriter key for selectively operating the clutches to set up on the adding machine the type-width value of the character.

3. A type layout machine having, in combination, a typewriter having provision for typing characters of uniform width, an adding machine, actuating means for the adding machine including plungers for depressing the keys of the adding machine, a continuously rotating shaft, a plurality of cams associated with the several plungers and loosely mounted on the shaft, a ratchet attached to the shaft adjacent to each cam, a pawl connected with each cam, a detent for normally holding the pawl out of engagement with the ratchet, and means controlled by depression of a typewriter key to remove the detent from engagement with the pawl to permit setting up on the adding machine the type width-value of the character.

4. A type layout machine having, in combination, a typewriter having provision for typing characters of uniform width, an adding machine, actuating means for the adding machine including plungers for depressing the keys of the adding machine, a continuously rotating shaft, a plurality of cams associated with the several plungers and loosely mounted on the shaft, a ratchet secured to the shaft adjacent to each cam, a pawl mounted on each cam, a detent for normally holding the pawl out of engagement with the ratchet, means for removing the detent from engagement with the pawl to permit the latter to be engaged by the ratchet, said means including a control device associated with the typewriter keys, and means for restoring the detent to raise the pawl from engagement with the ratchet at the completion of a single revolution of the shaft.

5. A type layout machine having, in combination, a typewriter adapted to type characters of indifferent widths and having shift devices to type upper or lower case characters, an adding mechanism, actuating means for setting up numerical values on the adding mechanism, a control device associated with each typewriter key, connections between the control devices and the actuating means, and means for altering said connections upon operation of the shift devices.

6. A type layout machine having, in combination, a typewriter adapted to type characters of indifferent widths, an adding mechanism, an actuating apparatus for the adding mechanism including electrically operated devices to set up numerical values on the adding mechanism, the typewriter having the usual type keys and shift devices, con acts associated with the type keys, electrical connections from the contacts to the electrically operated actuating devices, and means for changing the electrical connections upon operation of the typewriter shift devices.

7. A type layout machine having, in combination, a typewriter provided with the usual type, carriage and shift devices, a relatively movable contact block, an adding mechanism, actuating means for setting up numerals on the adding mechanism, electrical connections from one of the contact blocks to the actuating means, contacts on the other of the contact blocks adapted for selective closing of the electrical circuits upon depression of the typewriter keys, means for relatively moving the contact blocks upon operation of the shift devices of the typewriter, and associated contacts on the blocks for varying the electrical circuit depending upon the position of the shift devices of the typewriter.

8. A type layout machine having, in combination, a typewriter provided with the usual keys, carriage, and shift devices, a stationary contact block having contacts adapted to be engaged by the key levers, a movable contact block, connections between the shift devices and movable contact block for moving the latter relatively to the stationary contact block, a plurality of sets of cooperating contacts on the stationary movable blocks to close different circuits depending upon the relative positions of the stationary and movable blocks, an adding mechanism, and means cooperating with the adding mechanism and including electrical connections from the movable contact block to set up numerals on the adding mechanism in accordance with the keys depressed by the typewriter.

9. A type layout machine having, in combination, a typewriter having provision for typing characters of indifferent widths, an adding machine, actuating devices for the adding machine including devices for depressing the adding machine keys, a continuously rotating shaft, a plurality of cams associated with the several plungers and loosely mounted on the shaft and adapted to depress their corresponding plungers when operatively connected with the shaft, a single revolution clutch including a pawl and ratchet associated with each cam, an electro-magnet for each clutch, means controlled by energization of the magnet for operatively connecting the pawl and ratchet to rotate the cam, and means controlled by depression of the typewriter keys for selectively energizing the magnets to set up on the adding machine the type-width values of the characters.

10. A type layout machine having, in combination, a typewriter adapted to type characters of indifferent widths, an adding machine, actuating means for the adding machine including plungers for depressing the keys thereof, a continuously rotating shaft, cams associated with the several plungers and loosely mounted on the shaft, a ratchet attached to the shaft adjacent to each cam, a pawl connected with each cam, a detent for normally holding the pawl out of engagement with the ratchet, an electro-magnet and an armature associated with each detent, connections between the armature and the detent for disengaging the latter from the pawl upon energization of the magnet, and contacts adapted to be engaged upon depression of the typewriter keys to selectively energize the magnets, whereby the type-width values of the characters may be set up on the adding machine.

11. A type layout machine having, in combination, a typewriter having keys, type bars and shift devices to type upper or lower case characters, an adding mechanism, control devices associated with the typewriter keys to set up numerical values on the adding mechanism in accordance with the type width values of the typewritten characters, and connections between the shift devices and the control devices for altering the latter upon operation of the shift devices.

12. A type layout machine having, in combination, a typewriter having keys, type bars and shift devices to type upper or lower case characters, an adding mechanism, control devices associated with the several typewriter keys, connections between the control devices and the adding mechanism to set up numerical values on the adding mechanism in accordance with the type width values of the typewritten characters, and means operated by the shift devices for altering said connections.

13. A type layout machine having, in combination, a typewriter having the usual keys, a key driven adding machine, electrical contacts associated with each of the keys of the typewriter, actuating means for the adding machine keys including electro-magnetic devices, and plungers selectively operated by the electro-magnetic devices for depressing the adding machine keys to add the type width values of the characters.

In testimony whereof we have signed our names to this specification.
EDWARD L. MORSS.
ARTHUR W. BUCKWELL.
CARL G. SMITH.